United States Patent Office.

MOSES BECKER, OF PHILADELPHIA, PENNSYLVANIA.

Letters Patent No. 94,466, dated September 7, 1869.

IMPROVED STOMACH-BITTERS.

The Schedule referred to in these Letters Patent and making part of the same.

*To all whom it may concern:*

Be it known that I, MOSES BECKER, of Philadelphia, in the county of Philadelphia, and State of Pennsylvania, have invented new Stomach-Bitters; and I do hereby declare the following to be a clear and exact description of the nature thereof, sufficient to enable others skilled in the art to which my invention appertains, to fully understand and use the same.

In carrying out my invention, I employ the following ingredients, and in about the proportions stated:

Twenty pounds coriander-seed.
Six pounds ground orange-apples.
Six pounds ground gentian.
One pound Virginia snake-root.
Two pounds herb *Centaur minor*.
Two pounds angelica-root.
One pound bruised cardamom-seed.
Twenty pounds sweet-orange peel.
Twenty pounds red saunders.
One pound cinnamon-bark.
Two pounds pure ground nutmeg.
One pound pure ground calamus.
Ten barrels spirits.

I place all the aforesaid ingredients in a suitable vessel, and allow them to remain until the spirits have extracted the flavor and strength of the other ingredients. I then filter the compound, and afterwards draw it off in bottles, kegs or casks, as most convenient or desirable.

It will be found that I produce an article which is useful for all medical purposes to which bitters are applied or recommended, is a gentle stimulant, and possesses a pleasant and agreeable flavor as a drink, whether for private or bar-room uses.

The proportions of the various ingredients may be varied to suit the taste.

Having thus described my invention,

I claim the within-described, my stomach-bitters, compounded of the ingredients, and in about the proportions, as described.

In testimony that I have claimed the foregoing as my own, I have affixed my signature, in presence of two witnesses.

MOSES BECKER.

Witnesses:
S. WOLF,
D. BRUCE.